(12) United States Patent
Sun et al.

(10) Patent No.: US 9,442,323 B2
(45) Date of Patent: Sep. 13, 2016

(54) LIQUID CRYSTAL PANEL, DISPLAY DEVICE AND METHOD OF MANUFACTURING THE LIQUID CRYSTAL PANEL

(71) Applicant: BOE TECHNOLOGY GROUP CO., LTD., Beijing (CN)

(72) Inventors: Tao Sun, Beijing (CN); Shiming Shi, Beijing (CN); Ling Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 141 days.

(21) Appl. No.: 14/348,385

(22) PCT Filed: Jun. 17, 2013

(86) PCT No.: PCT/CN2013/077340
§ 371 (c)(1),
(2) Date: Mar. 28, 2014

(87) PCT Pub. No.: WO2014/161232
PCT Pub. Date: Oct. 9, 2014

(65) Prior Publication Data
US 2015/0146150 A1    May 28, 2015

(30) Foreign Application Priority Data

Apr. 1, 2013  (CN) .......................... 2013 1 0110410

(51) Int. Cl.
*G02F 1/1337*  (2006.01)
*G02F 1/1335*  (2006.01)
*G02F 1/1362*  (2006.01)

(52) U.S. Cl.
CPC ... *G02F 1/133753* (2013.01); *G02F 1/133512* (2013.01); *G02F 1/136286* (2013.01); *G02F 2001/133761* (2013.01); *G02F 2001/133773* (2013.01)

(58) Field of Classification Search
CPC .......................... G02F 1/133707; G02F 1/1393
See application file for complete search history.

(56) References Cited

U.S. PATENT DOCUMENTS

| 5,790,219 A | 8/1998 | Yamagishi et al. |
| 5,928,733 A * | 7/1999 | Yoneya .................. C09K 19/02 349/123 |

(Continued)

FOREIGN PATENT DOCUMENTS

| CN | 1293379 A | 5/2001 |
| CN | 202049313 U | 11/2011 |

(Continued)

OTHER PUBLICATIONS

Tsumura Akira; Mizunuma Masaya; Tabata Shin; Tamaya Akira; Morii Yasuhiro; Fujii Masayuki + Translation of JPH10213802, Aug. 1998.*

(Continued)

*Primary Examiner* — Phu Vu
(74) *Attorney, Agent, or Firm* — Ladas & Parry LLP (57) ABSTRACT

A liquid crystal panel, a display device and a method of manufacturing the liquid crystal panel are provided. In the liquid crystal panel according to the embodiments, the orientation of the liquid crystal molecules (40) corresponding to a pixel display region (1) is different from the orientation of the liquid crystal molecules (40) corresponding to a wiring region (2), such that the deflection angle of the liquid crystal molecules corresponding to the pixel display region is inconsistent with that of the liquid crystal molecules corresponding to the wiring region upon the liquid crystal panel being supplied with power. The display device according to the embodiments comprises the liquid crystal panel of the present invention. The method of manufacturing the liquid crystal panel according to the embodiments comprises making the pretilt angle of the alignment layer of the wiring region (2) on the array substrate (10) larger than that of the alignment layer of the pixel display region (1).

18 Claims, 8 Drawing Sheets

(56) References Cited

U.S. PATENT DOCUMENTS 6,522,379 B1 2/2003 Ishihara et al.
2007/0024784 A1 2/2007 Yoshida et al.

FOREIGN PATENT DOCUMENTS

EP 0549283 A2 6/1993
JP H10213802 A 8/1998

OTHER PUBLICATIONS

International Search Report for International Application No. PCT/CN2013/077340 issued Dec. 27, 2013, 12pgs.
The State Intellectual Property Office of the People'S Republic of China ("SIPO") (Chinese language) first office action issued on Jan. 16, 2015 by SIPO in Chinese Patent Application 201310110410.7. Six (6) pages.
English Translation of The State Intellectual Property Office of the People'S Republic of China ("SIPO") (Chinese language) first office action issued on Jan. 16, 2015 by SIPO in Chinese Patent Application 201310110410.7. Three (3) pages.
English abstract of JPH10213802A; Two (2) pages.
Second Chinese Office Action dated May 19, 2015; Appln. No. 201310110410.7.
International Preliminary Report on Patentability issued Oct. 6, 2015; PCT/CN2013/077340.

* cited by examiner

LIQUID CRYSTAL PANEL, DISPLAY DEVICE AND METHOD OF MANUFACTURING THE LIQUID CRYSTAL PANEL

CROSS REFERENCE TO RELATED APPLICATIONS

This application is based on International Application No. PCT/CN2013/077340 filed on Jun. 17, 2013, which claims priority to Chinese National Application No. 201310110410.7 filed on Apr. 1, 2013. The entire contents of each and every foregoing application are incorporated herein by reference.

TECHNICAL FIELD

Embodiments of the present invention relate to a liquid crystal panel, a display device and a method of manufacturing the liquid crystal panel.

BACKGROUND

Figure 1:
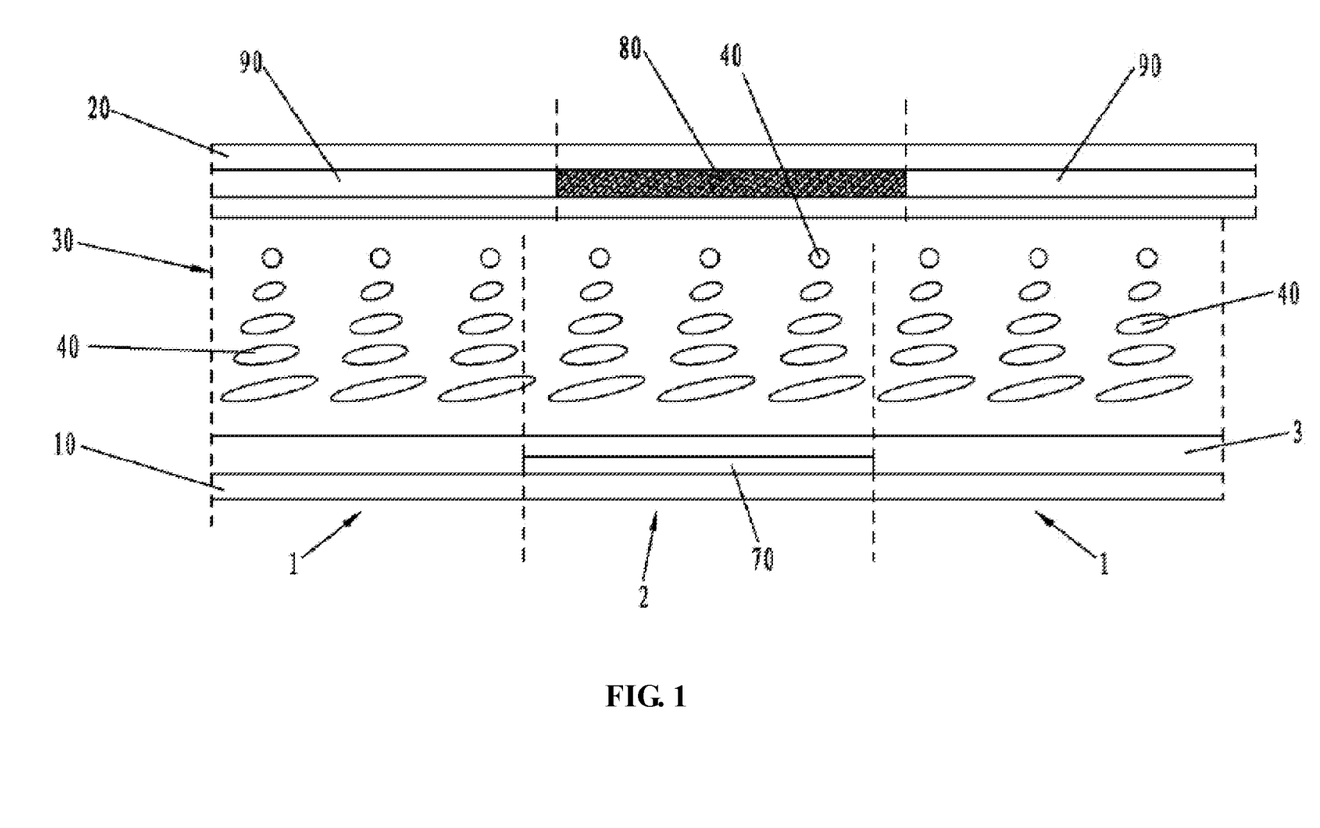
FIG. 1 is a structural schematic diagram of a liquid crystal panel in the prior art without voltage being applied.
Figure 2:
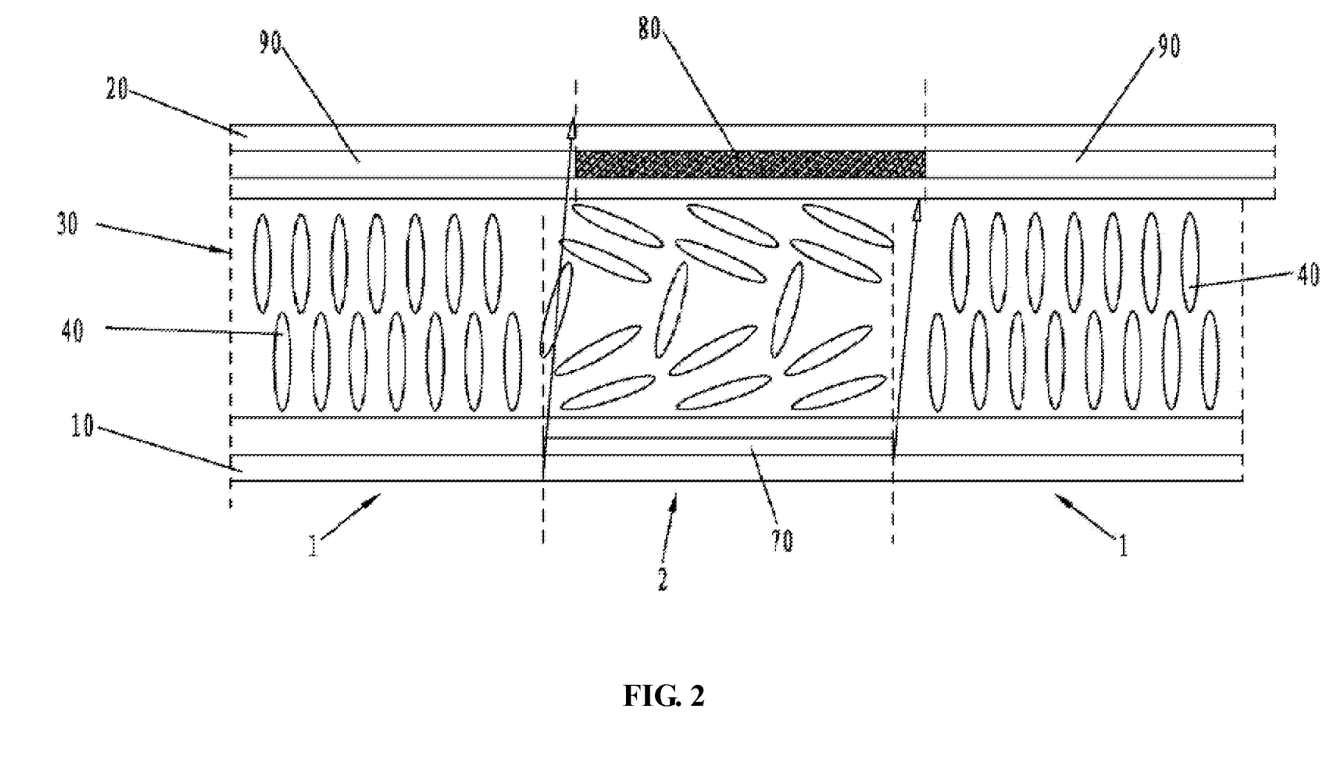
FIG. 2 is a structural schematic diagram of the liquid crystal panel in the prior art upon voltage being applied.

In recent years, the liquid crystal display (TFT-LCD) gradually substitutes the cathode ray tube display (CRT) as it is light and thin. Generally, the liquid crystal display comprises a liquid crystal panel and a backlight module. As illustrated in FIGS. 1 and 2, the common liquid crystal display panel comprises an array substrate 10, a counter substrate 20 disposed in parallel to the array substrate 10, and a liquid crystal layer 30 filled between the array substrate and the counter substrate. The side of the array substrate 10 close to the liquid crystal layer 30 and the side of the counter substrate 20 close to the liquid crystal layer 30 are respectively coated with alignment layers and subjected to orientation treatments, such that liquid crystal molecules 40 of the liquid crystal layer 30 orientate and form an initial pre-tilted angle. A pixel display region 1 and a wiring region 2 are disposed on the array substrate 10, and a black matrix 80 and a color filter layer 90 are disposed on the counter substrate 20. A polarizer and an analyzer (not illustrated in the figures) are respectively adhered to the outer side face of the array substrate 10 and the outer side face of the counter substrate 20, such that the light emitted from the backlight module becomes linear polarized light. Upon the liquid crystal panel being applied power, the liquid crystal molecules 40 of the liquid crystal layer 30 will deflect and the liquid crystal panel displays images.

In the above liquid crystal panel, the black matrix 80 disposed on the counter substrate 20 is used to block the light emitted from the backlight module and passing through the wiring region 2 on the array substrate 10 and a TFT driving portion, to improve display contrast, prevent color mixing and increase color purity. Generally, the deigned width of the black matrix 80 is larger than the width of the wire on the array substrate 10, but during actual production, when the array substrate 10 is cell-assembled with the counter substrate 20, there exists an alignment error, which renders bad adhering and aligning between the array substrate 10 and the counter substrate 20, and then the black matrix 80 has lateral displacement and cannot satisfactorily block the wire on the array substrate 10 or the TFT driving portion. The hollow arrows in FIGS. 1 and 2 illustrate the light transmission direction, upon the liquid crystal panel being supplied power, the light leaks from the edge of the black matrix 80, and then light leakage is rendered. As for the above problem, the usual design is to further widen the black matrix 80 to reduce the light leakage due to the alignment error, but the method takes the expense of sacrificing the opening rate and meanwhile lowers light transmittance to a certain extent.

SUMMARY

A purpose of the present invention is to provide a liquid crystal panel, a display device and a method of manufacturing the liquid crystal panel, which are able to prevent light leakage while improve the opening rate and the light transmittance.

An embodiment of the present invention provides a liquid crystal panel, comprising: an array substrate, an counter substrate and a liquid crystal layer disposed between the array substrate and the counter substrate, and the array substrate comprises a plurality of gate lines and a plurality of data lines, the plurality of gate lines and the plurality of data lines define a plurality of pixel units, the pixel units comprise pixel display regions and thin film transistor regions, the orientation of the liquid crystal molecules corresponding to the pixel display regions is different from that of the liquid crystal molecules corresponding to wiring regions where the gate lines and the data line are located, such that the deflection angle of the liquid crystal molecules corresponding to the pixel display regions is inconsistent with the deflection angle of the liquid crystal molecules corresponding to the wiring regions upon the liquid crystal panel being applied with power.

In one example, an orientation of the liquid crystal molecules corresponding to the thin film transistor region is different from that of the liquid crystal molecules corresponding to the pixel display region.

In one example, the orientation of the liquid crystal molecules corresponding to the thin film transistor region is identical with that of the liquid crystal molecules corresponding to the wiring region.

In one example, the orientation of the liquid crystal molecules corresponding to the wiring region keeps perpendicular to the array substrate and the counter substrate.

In one example, the liquid crystal molecules which orientation keeps perpendicular to the array substrate and the counter substrate form a perpendicular orientation region within the liquid crystal layer, and the perpendicular orientation region has a width equivalent to or larger than that of the wiring region of the array substrate.

In one example, the difference between the width of the perpendicular orientation region and that of the wiring region of the array substrate is not more than 1 microns.

In one example, a first alignment layer is disposed at the side of the array substrate close to the liquid crystal layer, and the first alignment layer comprises a first alignment portion corresponding to the pixel display region and a second alignment portion corresponding to the wiring region, and the pretilt angle of the second alignment portion is different from that of the first alignment portion.

In one example, a second alignment layer is disposed at the side of the counter substrate close to the liquid crystal layer, and the second alignment layer comprises a third alignment portion corresponding to the first alignment portion and a fourth alignment portion corresponding to the second alignment portion, and the pretilt angle of the fourth alignment portion is different from that of the third alignment portion.

In one example, the pretilt angle of the second alignment portion is larger than that of the first alignment portion, such that the pretilt angle of the liquid crystal molecules in the wiring region is larger than that of the liquid crystal molecules corresponding to the pixel display region.

In one example, the pretilt angle of the fourth alignment portion is larger than that of the third alignment portion.

In one example, the pretilt angle of the first alignment layer in the thin film transistor region is identical with that of the second alignment portion.

In one example, the orientation direction of the first alignment portion is perpendicular to that of the third alignment portion, and the orientation direction of the second alignment portion is parallel to that of the fourth alignment portion.

Another embodiment of the present invention provides a display device, comprising the liquid crystal panel according to any of the embodiments of the present invention.

A further embodiment of the present invention provides a method of manufacturing the liquid crystal panel, comprising the following steps:

step 1: coating an alignment layer material on an array substrate to form a first alignment layer, coating an alignment layer material on an counter substrate to form a second alignment layer, respectively conducting friction alignment to the first alignment layer on the array substrate and the second alignment layer on the counter substrate;

step 2: covering a first protective layer over a surface of a pixel display region on the array substrate, using an oblique evaporation method such that the pretilt angle of the alignment layer of the wiring region on the array substrate is larger than that of the alignment layer of the pixel display region, and removing the first protective layer; and step 3: cell-assembling the array substrate with the counter substrate.

In one example, the step 2 further comprises covering a second protective layer over the surface of the first region on the counter substrate corresponding to the pixel display region on the array substrate, using the oblique evaporation method to change the orientation direction of the alignment layer of the second region on the counter substrate corresponding to the wiring region on the array substrate, such that pretilt angle of the alignment layer of the second region is larger than that of the alignment layer of the first region, and removing the second protective layer.

In one example, the manufacturing method further comprises dripping liquid crystals on the surface of the array substrate or the counter substrate formed with the alignment layer between the second step and the third step; or dripping the liquid crystals between the array substrate and the counter substrate after the third step.

As for the liquid crystal panel according to the embodiments of the present invention, the deflection of the liquid crystal molecules corresponding to the pixel display region is always inconsistent with that of the liquid crystal molecules corresponding to the wiring region through changing the orientation directions of the liquid crystal molecules corresponding to the pixel display region and liquid crystal molecules corresponding to the wiring region, and the light is blocked using the deflection disorder of the liquid crystal molecules corresponding to the wiring region. Even if the array substrate and the counter substrate generate the alignment error during the assembling process and the black matrix fails to block the edge of the pixel display region, the disordered liquid crystal molecules corresponding to the wiring region block the light, thus, in the case of dark state display, the light leakage between the pixel display region and the wiring region is reduced and the contrast is improved. Compared with the prior art, the width of the black matrix of the liquid crystal panel of the present invention can be smaller, thus the opening rate is enhanced and meanwhile the transmittance is improved.

The first alignment layer in the embodiments of the present invention comprises a first alignment portion and a second alignment portion, i.e., the first alignment portion and the second alignment portion are a portion of the first alignment layer, respectively. The second alignment layer according to the embodiments of the present invention comprises a third alignment portion and a fourth alignment portion, i.e., the third alignment portion and the fourth alignment portion are a portion of the second alignment layer, respectively. The pretilt angle of the alignment layer (alignment portions) is the angle of the slope of the surface groove of the alignment layer (alignment portions), which determines the pretilt angle of the liquid crystal molecules. The orientation direction of the alignment layer (alignment portions) refers to the friction direction when a friction alignment treatment is conducted to the alignment layer.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The liquid crystal panel according to embodiments of the present invention is applicable to a TN display mode.

Figure 3:
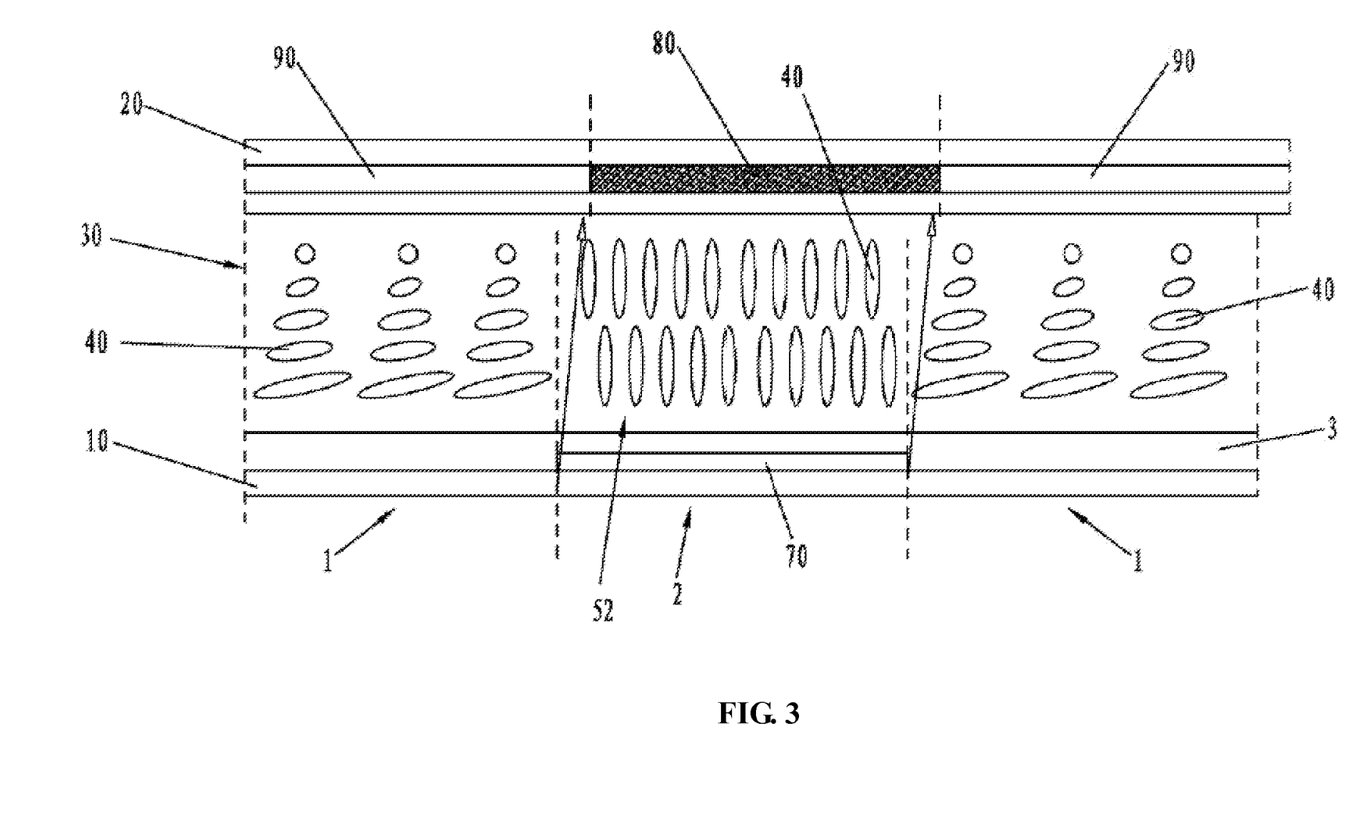
FIG. 3 is a structural schematic diagram of a liquid crystal panel without voltage being applied according to a first embodiment of the present invention.

As illustrated in FIG. 3, the liquid crystal panel according to the embodiments of the present invention comprises an array substrate 10, a counter substrate 20 disposed to be opposed to and cell-assembled with the array substrate 10, and a liquid crystal layer 30 disposed between the array substrate 10 and the counter substrate 20. The array substrate 10 and the counter substrate 20 are arranged parallel to each other, and the liquid crystal layer 30 is filled into the gap between the array substrate 10 and the counter substrate 20. The array substrate 10 comprises a plurality of gate lines (no illustrated in the drawing) and a plurality data lines 70 which define a plurality of pixel units, and each of the pixel units comprises a pixel unit region 1 and a thin film transistor region (not illustrated in the drawing). The region where the gate lines and the data lines 70 are located is called a wiring region 2. A black matrix 80 and a color filter layer 90 are provided on the counter substrate 20, and the black matrix 80 is used to block the light emitted from the backlight module and passing through the wiring region 2 on the array substrate 10 and a thin film transistor driving portion. The orientation of liquid crystal molecules 40 corresponding to the pixel display region 1 is different from the orientation of the liquid crystal moles 40 corresponding to the wiring region 2 where the gate lines and data lines 70 are located, such that the deflection angle of the liquid crystal molecules 40 corresponding to the pixel display region 1 is inconsistent with that of the liquid crystal molecules 40 corresponding to the wiring region 2 when the liquid crystal panel is not supplied power. According to the embodiment of the liquid crystal panel of the present invention, the deflection of the liquid crystal molecules corresponding to the pixel display region is always different from the deflection of the liquid crystal molecules corresponding to the wiring region through changing the orientation directions of the liquid crystal molecules corresponding to the pixel display region and the liquid crystal molecules corresponding to the wiring region, and light is blocked through the deflection disorder of the liquid crystal molecules corresponding to the wiring region. Even if the array substrate and the counter substrate generate the alignment error during the cell-assembling process, and the black matrix fails to shield the edge of the pixel display region, the disordered liquid crystal molecules corresponding to the wiring region block the light, thus light leakage will not occur. In addition, compared with the prior art, according to the embodiments of the liquid crystal panel of the present invention, the width of the black matrix can be smaller, thus the opening rate is enhanced and the transmittance is improved at the same time.

For the liquid crystal panel according to the embodiments of the present invention, the orientation of the liquid crystal molecules corresponding to the thin film transistor region is different from the orientation of the liquid crystal molecules 40 corresponding to the pixel display region 1.

For the liquid crystal panel according to the embodiments of the present invention, the orientation of the liquid crystal molecules corresponding to the thin film transistor region is identical with that of the liquid crystal molecules 40 corresponding to the wiring region 2.

In order to achieve the display function of the liquid crystal panel, different voltages need to be applied to the liquid crystal panel to present different gray levels. Supplying power in the accompanying drawings of the embodiments of the present invention refers to applying the maximum voltage, i.e., the voltage that needs to be applied to deflect the liquid crystal molecules by a maximum angle.

Embodiment 1

Figure 4:
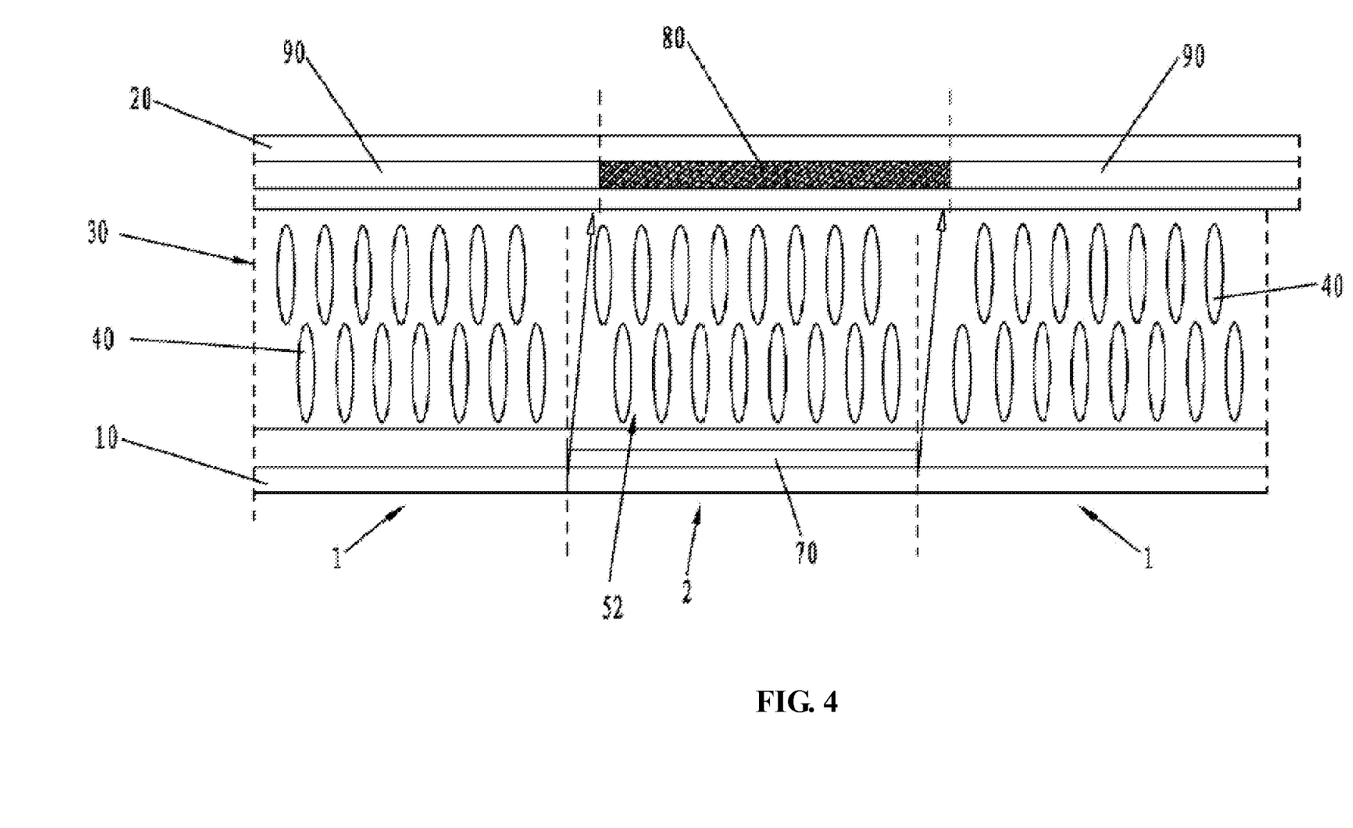
FIG. 4 is a structural schematic diagram of the liquid crystal panel upon voltage being applied according to the first embodiment of the present invention.

In combination with FIGS. 3 and 4, according to the embodiments of the liquid crystal panel of the present invention, the orientation of the liquid crystal molecules 40 corresponding to the wiring region 2 keeps perpendicular to the array substrate 10 and the counter substrate 20.

For the liquid crystal panel according to the embodiments of the present invention, the liquid crystal molecules 40 having orientation perpendicular to the array substrate 10 and the counter substrate 20 form a perpendicular orientation region 52 within the liquid crystal layer 30, and the width of the perpendicular orientation region 52 is equivalent to or larger than the width of the wiring region 2 of the array substrate 10.

For the liquid crystal panel according to the embodiments of the present invention, the difference between the width of the perpendicular orientation region 52 and the width of the wiring region 2 of the array substrate 10 is not more than 1 micron.

When the liquid crystal panel of the embodiments of the present invention is not supplied power, the liquid crystal molecules 40 corresponding to the pixel display region 1 presents 90-degree twisting; while the liquid crystal molecules 40 corresponding to the wiring region 2 are perpendicular to the array substrate 10 and the counter substrate 20.

Regardless of supplying power to the liquid crystal panel or not, the liquid crystal molecules 40 corresponding to the wiring region 2 keep perpendicular to the array substrate 10 and the counter substrate 20. As illustrated in FIGS. 3 and 4, the hollow arrows indicates the light transmitting direction, upon cell-assembling of the array substrate 10 with the counter substrate 20 generating a deviation, the perpendicular liquid crystal molecules 40 prevent the light leakage from the edge of the black matrix 80, such that the width of the black matrix 80 can be smaller, and then the opening rate of the liquid crystal panel is enhanced and the transmittance is improved at the same time.

For the liquid crystal panel according to the embodiments of the present invention, the width of the perpendicular orientation region 52 can also be larger than the width of the wiring region 2 of the array substrate 10; as the long axis of the liquid crystal molecules 40 is only more than ten microns, the width of the perpendicular orientation region 52 need not be much larger than the width of the wiring region 2; if the perpendicular orientation region 52 is too wide, due to the boundary effect, the deflection disorder of the liquid crystal molecules 40 corresponding to the pixel display region 1 will be rendered, thus the width of the perpendicular orientation region 52 is disposed larger than the width of the wiring region 2 of the array substrate 10 by not more than 1 micron, then the width of the black matrix 80 is reduced and the pixel opening rate is improved at the same time.

Embodiment 2

Figure 5:
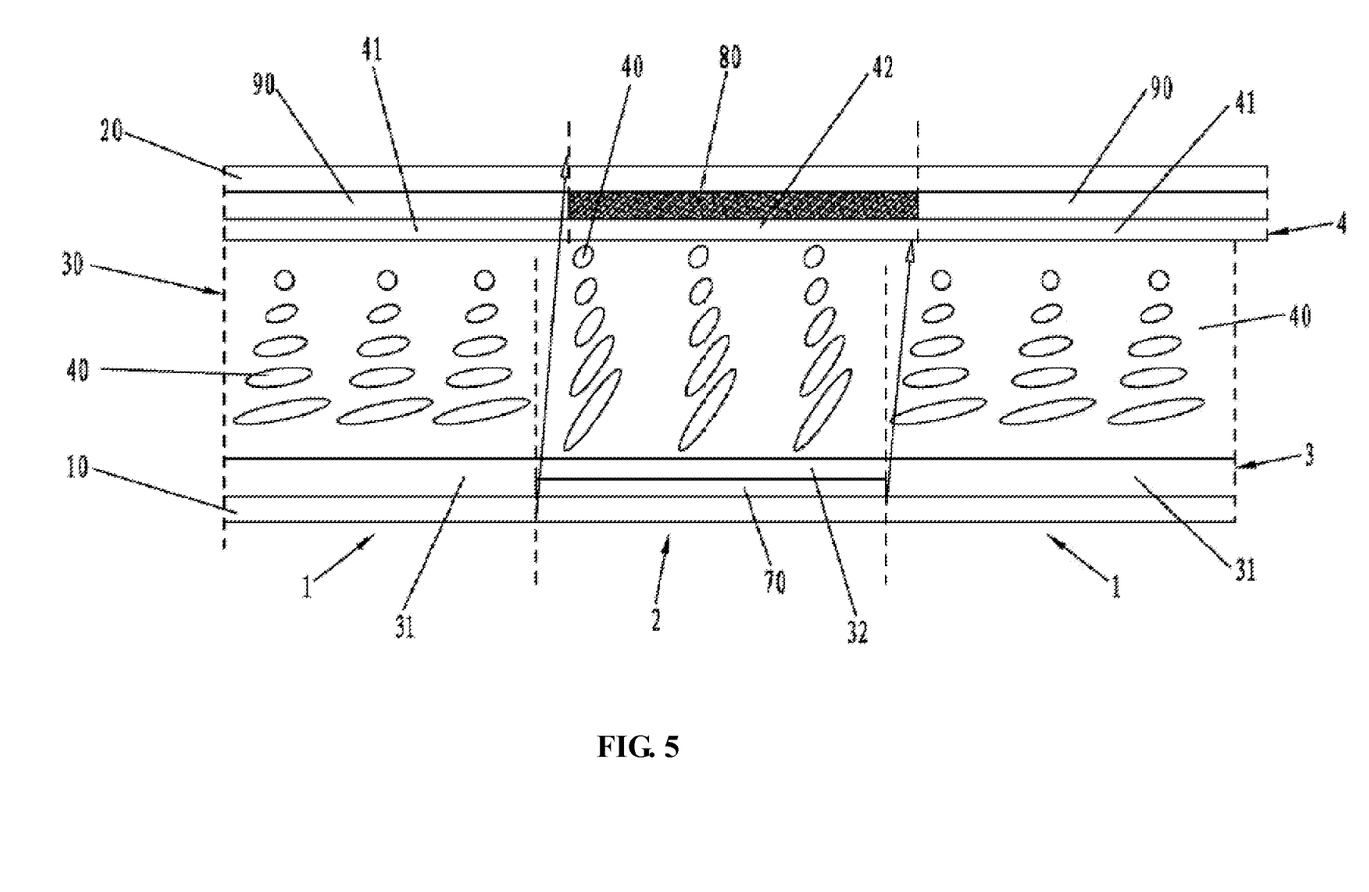
FIG. 5 is a structural schematic diagram of a liquid crystal panel without voltage being applied according to a second embodiment of the present invention.
Figure 6:
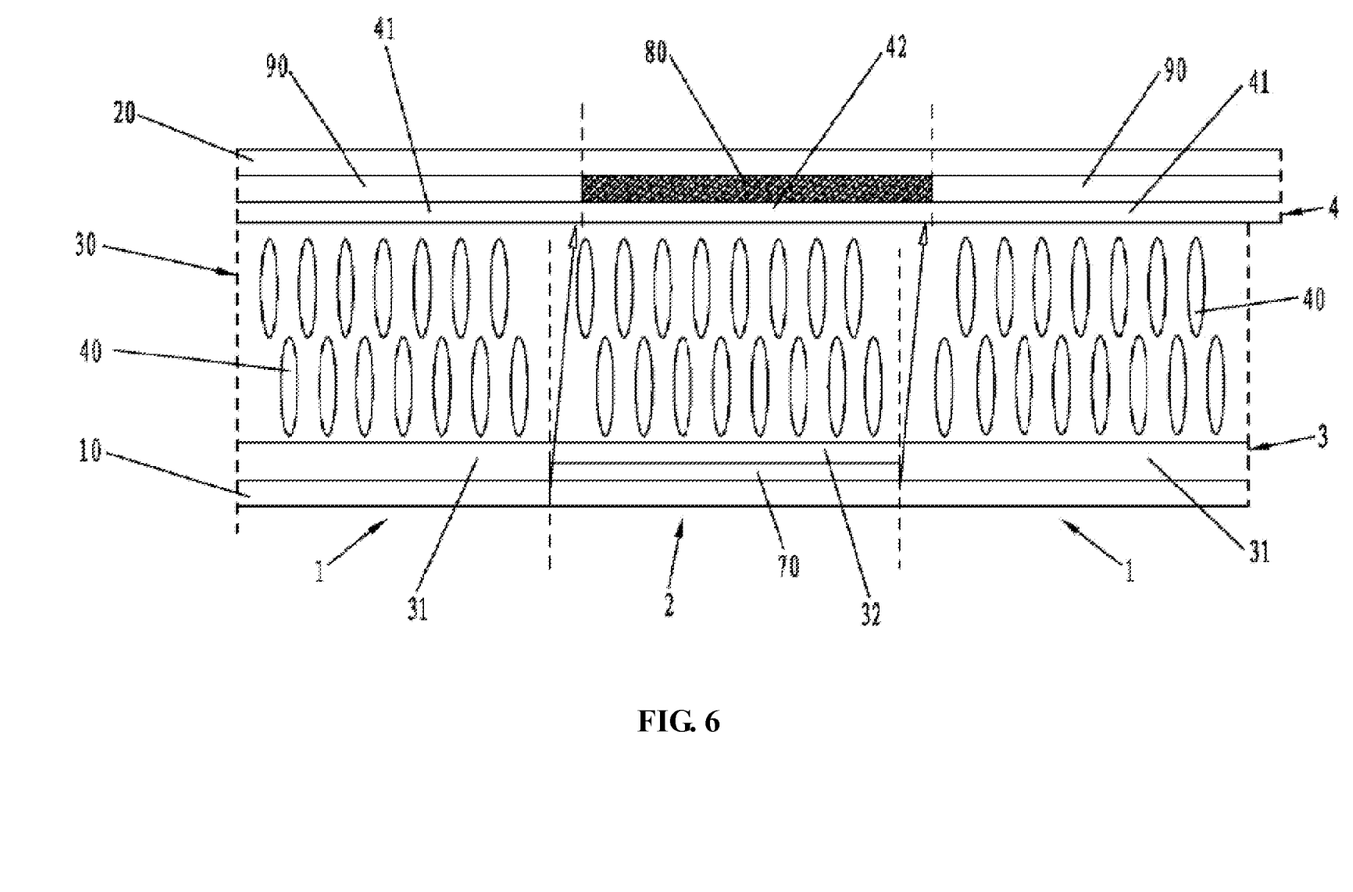
FIG. 6 is a structural schematic diagram of the liquid crystal panel upon voltage being applied according to the second embodiment of the present invention.

In combination with FIGS. 5 and 6, for the liquid crystal panel according to the embodiments of the present invention, a first alignment layer 3 is disposed at the side of the array substrate 10 close to the liquid crystal layer 30, and is formed with a first alignment portion 31 corresponding to the pixel display region 1 and a second alignment portion 32 corresponding to the wiring region 1, and the pretilt angle of the second alignment portion 32 is different from the pretilt angle of the first alignment portion 31.

For the liquid crystal panel according to the embodiments of the present invention, a second alignment layer 4 is disposed at the side of the counter substrate 20 close to the liquid crystal layer 30, and is formed with a third alignment portion 41 corresponding to the first alignment portion 31 and a fourth alignment portion 42 corresponding to the second alignment portion 32, and the pretilt angle of the fourth alignment portion 42 is different from the pretilt angle of the third alignment portion 41.

For the liquid crystal panel according to the embodiments of the present invention, the pretilt angle of the second alignment portion 32 is larger than the pretilt angle of the first alignment portion 31, such that the pretilt angle of the liquid crystal molecules 40 of the wiring region 2 is larger than the pretilt angle of the liquid crystal molecules 40 corresponding to the pixel display region 1.

For the liquid crystal panel according to the embodiments of the present invention, the pretilt angle of the fourth alignment portion 42 is larger than the pretilt angle of the third alignment portion 41.

For the liquid crystal panel according to the embodiments of the present invention, the pretilt angle of the first alignment layer 3 of the thin film transistor region is identical with the pretilt angle of the second alignment portion 32.

Such a design ensures that the orientation of the liquid crystal molecules 40 corresponding to the pixel display region 1 is different from the orientation of the liquid crystal molecules 40 corresponding to the wiring region 2, thus the objects of the invention are achieved.

The embodiments of the present invention take a twisted nematic (TN) normal white mode as an example. Upon the liquid crystal panel according to the embodiments of the present invention being not supplied power, the liquid crystal molecules 40 corresponding to the pixel display region 1 present 90-degree twisting, and the liquid crystal molecules corresponding to the wiring region 2 also present 90-degree twisting; the pretilt angle of the liquid crystal molecules 40 corresponding to the pixel display region 1 is smaller than the pretilt angle of the liquid crystal molecules 40 of the wiring region 2. The light emitted from the backlight module is changed into a linear polarized light after passing through a lower polarizer (polarizer) (not illustrated in the drawing), and the linear polarized light passes through the liquid crystal layer 30 which liquid crystal molecules present 90-degree twisting, the polarizing direction of the light rotates 90 degrees and can passes through an upper polarizer (analyzer) (the light transmission axis of the upper polarizer is perpendicular to the light transmission axis of the lower polarizer), and the liquid crystal panel presents a bright state.

Upon power being supplied to the liquid crystal panel of the embodiments of the present invention, the liquid crystal molecules 40 corresponding to the pixel display region 1 and the liquid crystal molecules 40 corresponding to the wiring region 2 are perpendicular to the array substrate 10 and the counter substrate 20. At this moment, the linear polarized light passes through the liquid crystal layer 30, and the light polarizing direction is not changed, the light cannot pass through the upper polarizer and the liquid crystal panel presents a dark state.

In the prior art, as the electrical fields of the pixel display region 1 and wiring region 2 are inconsistent with each other; upon power being supplied, the liquid crystal molecules corresponding to the wiring region 2 still present twisting, and the polarizing direction of the linear polarized light is changed after passing through the liquid crystal layer in the wiring region, and if there is not the black matrix or the black matrix cannot shield the wiring region due to the cell-assembling deviation, the light can transmit the upper polarizer and then light leakage is rendered. In the embodiment of the present invention, the pretilt angle of the liquid crystal molecules of the wiring region 2 is larger than the pretilt angle of the liquid crystal molecules of the pixel display region 1. Upon power being supplied, although the electrical fields of the pixel display region 1 and wiring region 2 are inconsistent with each other (the electrical field of the wiring region 2 is usually weaker), the deflection angle of the liquid crystal molecules 40 corresponding to the wiring region 2 is also inconsistent with the deflection angle of the liquid crystal molecules 40 corresponding to the pixel display region 1, such that the liquid crystal molecules corresponding to the wiring region 2 can just present a state of being perpendicular to the array substrate 10, the polarizing direction of the linear polarized light is not changed and light leakage will not occur. As illustrated in FIGS. 5 and 6, the hollow arrows indicate the light transmission direction, upon cell-assembling of the array substrate 10 with the counter substrate 20 generating deviation, the perpendicular liquid crystal molecules 40 prevent the light leakage from the edge of the black matrix 80, such that the width of the black matrix 80 can be smaller, thus the opening rate of the liquid crystal panel is enhanced and the transmittance is improved at the same time.

Embodiment 3

Figure 7:
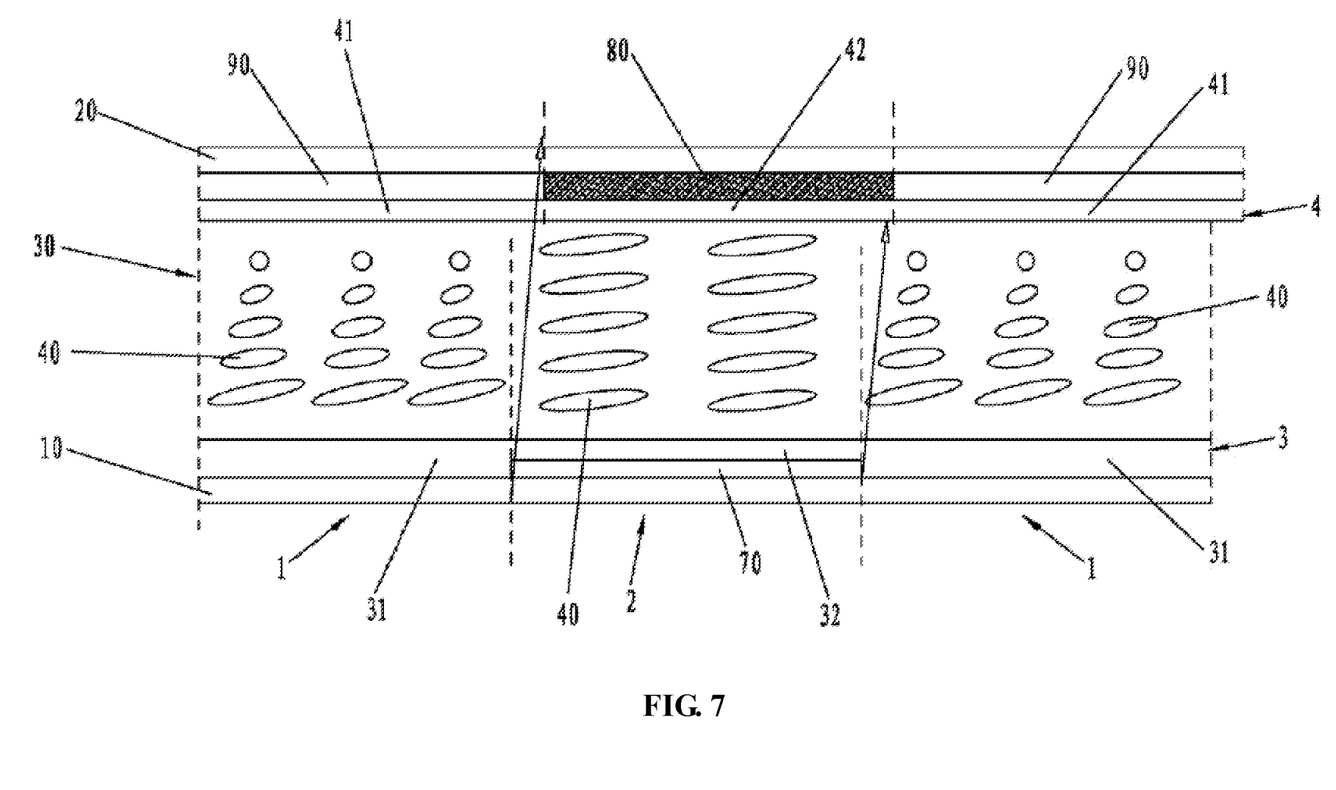
FIG. 7 is a structural schematic diagram of the liquid crystal panel without voltage being applied according to the third embodiment of the present invention.

In combination with FIG. 7, the difference between the present embodiment and the embodiment 2 lies in that the orientation direction of the first alignment portion 31 is perpendicular to that of the third alignment portion 41, and the orientation direction of the second alignment portion 32 is parallel to that of the fourth alignment portion 42.

For the liquid crystal panel according to the embodiments of the present invention, the orientation direction of the second alignment portion 32 can be parallel or anti-parallel to that of the fourth alignment portion 42.

Upon power being not supplied to the liquid crystal panel of the embodiments of the present invention, the liquid crystal molecules 40 corresponding to the pixel display region 1 present 90-degree twisting; while the liquid crystal molecules 40 corresponding to the wiring region 2 does not present 90-degree twisting. The light is changed into a linear polarized light after passing through the lower polarizer, and the linear polarized light passes through the liquid crystal layer 30 which liquid crystal molecules in the pixel display region present 90-degree twisting, and the polarizing direction of the light rotates 90 degrees, and the liquid crystal panel presents a bright state through the upper polarizer. The polarizing direction of the light is not changed when the linear polarized light passes through the liquid crystal layer of the wiring region 2.

Upon power being supplied to the liquid crystal panel of the embodiments of the present invention, the state of the liquid crystal molecules 40 corresponding to the pixel display region 1 is changed, the liquid crystal molecules 40 corresponding to the wiring region 2 deflect while do not present 90-degree twisting, the polarizing direction of the linear polarized light is not changed, at this moment, the liquid crystal panel presents a dark state; the hollow arrow in FIG. 7 indicates the light transmission direction, upon cell-assembling of the array substrate 10 with the counter substrate 20 generating deviation, the liquid crystal molecules 40 which do not present the 90-degree twisting also block the light leakage from the edge of the black matrix 80, such that the width of the black matrix 80 can be smaller, thus the opening rate of the liquid crystal panel is enhanced and the transmittance is improved at the same time.

The first alignment layer in the embodiments of the present invention comprises a first alignment portion and a second alignment portion, i.e., the first alignment portion and the second alignment portion are a portion of the first alignment layer. The second alignment layer according to the embodiments of the present invention comprises a third alignment portion and a fourth alignment portion, i.e., the third alignment portion and the fourth alignment portion are a portion of the second alignment layer. The pretilt angle of the alignment layer (alignment portions) is the angle of the surface groove surface of the alignment layer (alignment portions), which determines the pretilt angle of the liquid crystal molecules. The orientation direction of the alignment layer (alignment portions) indicates the friction direction when a friction alignment treatment is conducted to the alignment layer.

The display device according to the embodiments of the present invention comprises the liquid crystal panel according to any of the embodiments of the present invention.

The display device according to the embodiments of the present invention can be any product or member having a display function, such as a liquid crystal panel, an electronic paper, a liquid crystal TV, a liquid crystal display, a digital photo frame, a mobile phone, a tablet computer.

Figure 8:
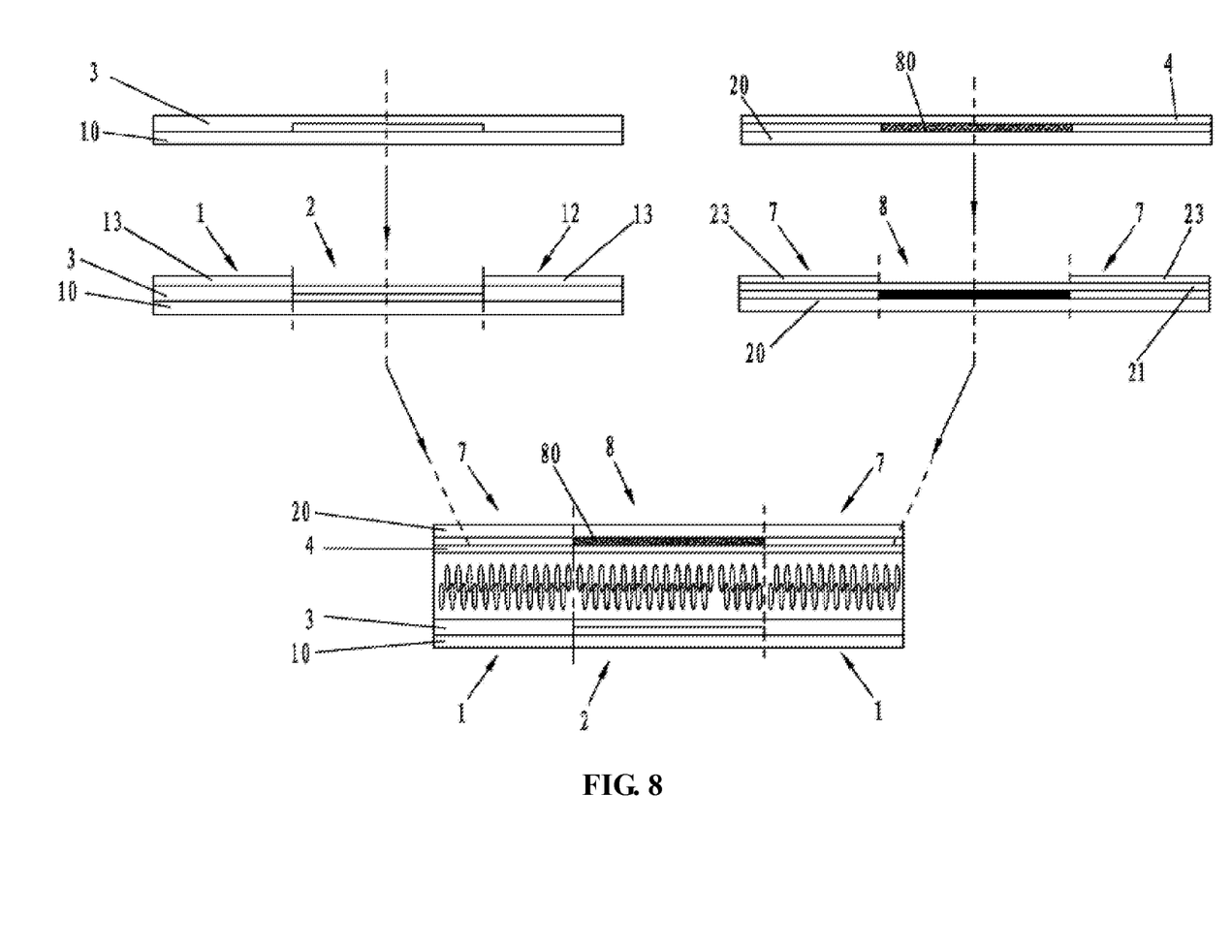
FIG. 8 is a flow chart of a method of manufacturing the liquid crystal panel according to the embodiments of the present invention.

As illustrated in FIG. 8, the method of manufacturing the liquid crystal panel according to the embodiments of the present invention comprises the following steps:

step 1, coating an alignment layer material on the array substrate 10, forming a first alignment layer 3, coating an alignment layer material on the counter substrate 20 where the black matrix 80 is formed, forming a second alignment layer 4, and respectively conducting friction alignment to the first alignment layer 3 on the array substrate 10 and the second alignment layer 4 on the counter substrate 20;

step 2, covering a first protective layer 13 over the surface of the pixel display region 1 on the array substrate 10, using an oblique evaporating method to make the pretilt angle of the alignment layer of the wiring region 2 on the array substrate 10 larger than the pretilt angle of the alignment layer of the pixel display region 1, and removing the first protective layer 13; and step 3, cell-assembling the array substrate 10 and the counter substrate 20.

For the method of manufacturing the liquid crystal panel of the embodiments of the present invention, the step 2 further comprises:

covering a second protective layer 23 on the surface of the first region 7 on the counter substrate 20 corresponding to the pixel display region 1 of the array substrate 10, using the oblique evaporating method to change the alignment direction of the alignment layer of the second region 8 on the counter substrate 20 corresponding to the wiring region 2 on the array substrate 10, such that the pretilt angle of the alignment layer of the second region 8 is larger than the pretilt angle of the alignment layer of the first region 7, and removing the second protective layer 23.

In addition, the method of manufacturing the liquid crystal panel according to the embodiments of the present invention further comprises the step of forming the liquid crystal layer. For example, the method of applying liquid crystals in the present invention comprises, but not limited to, a dripping method and an injecting method. For example, the liquid crystals can be dripped on the surface of the array substrate 10 or the counter substrate 20 where the alignment layers are formed between the above step 2 and the step 3; or liquid crystals are injected into the gap between the array substrate 10 and the counter substrate 20 after the step 3.

The method of manufacturing the liquid crystal panel according to the embodiments of the present invention uses the oblique evaporating method to make the pretilt of the alignment layer of the wiring region 2 on the array substrate 10 larger than that of the alignment layer of the pixel display region 1, and when the oblique evaporating method is used to change alignment direction of the alignment layer of the second region 8 on the counter substrate 20 corresponding to the wiring region 2 on the array substrate 10, the evaporation angle falls within a range of 5 to 20 degrees.

For the method of manufacturing the liquid crystal panel according to the embodiments of the present invention, both the materials of the first protective layer 13 and the second protective layer 23 are quartz.

The embodiments described above are just exemplary ones of the present invention, and are not intended to limit the scope of protection of the invention. The scope of protection of the present invention shall be defined by the appended claims.

The invention claimed is:

1. A liquid crystal panel, comprising an array substrate, an counter substrate cell-assembled with the array substrate and a liquid crystal layer disposed between the array substrate and the counter substrate, the array substrate comprising a plurality of gate lines and a plurality of data lines which define a plurality of pixel units, and each of the pixel units comprising a pixel display region and a thin film transistor region, wherein, an orientation of liquid crystal molecules corresponding to the pixel display region is different from an orientation of the liquid crystal molecules corresponding to a wiring region where the gate lines and the data lines are located, such that a deflection angle of the liquid crystal molecules corresponding to the pixel display region is inconsistent with that of the liquid crystal molecules corresponding to the wiring region upon the liquid crystal panel being supplied with power, the orientation of the liquid crystal molecules corresponding to the wiring region keeps perpendicular to the array substrate and the counter substrate.

2. The liquid crystal panel according to claim 1, wherein, an orientation of the liquid crystal molecules corresponding to the thin film transistor region is different from the orientation of the liquid crystal molecules corresponding to the pixel display region.

3. The liquid crystal panel according to claim 1, wherein, the orientation of the liquid crystal molecules corresponding to the thin film transistor region is identical with the orientation of the liquid crystal molecules corresponding to the wiring region.

4. The liquid crystal panel according to claim 1, wherein, the liquid crystal molecules having an orientation perpendicular to the array substrate and the counter substrate form a perpendicular orientation region within the liquid crystal layer, and the perpendicular orientation region has a width equivalent to or larger than a width of the wiring region of the array substrate.

5. The liquid crystal panel according to claim 4, wherein, a difference between the width of the perpendicular orientation region and the width of the wiring region of the array substrate is not more than 1 micron.

6. The liquid crystal panel according to claim 1, wherein, a first alignment layer is disposed at a side of the array substrate close to the liquid crystal layer, and the first alignment layer comprises a first alignment portion corresponding to the pixel display region and a second alignment portion corresponding to the wiring region, and a pretilt angle of the second alignment portion is different from that of the first alignment portion.

7. The liquid crystal panel according to claim 6, wherein, a second alignment layer is disposed at a side of the counter substrate close to the liquid crystal layer, and the second alignment layer comprises a third alignment portion corresponding to the first alignment portion and a fourth alignment portion corresponding to the second alignment portion, and a pretilt angle of the fourth alignment portion is different from that of the third alignment portion.

8. The liquid crystal panel according to claim 7, wherein, the pretilt angle of the second alignment portion is larger than the pretilt angle of the first alignment portion, such that a pretilt angle of the liquid crystal molecules in the wiring region is larger than that of the liquid crystal molecules corresponding to the pixel display region.

9. The liquid crystal display panel according to claim 7, wherein, the pretilt angle of the fourth alignment portion is larger than the pretilt angle of the third alignment portion.

10. The liquid crystal panel according to claim 8, wherein, the pretilt angle of the first alignment layer in the thin film transistor region is identical with the pretilt angle of the second alignment portion.

11. The liquid crystal panel according to claim 7, wherein, the orientation direction of the first alignment portion is perpendicular to the orientation direction of the third alignment portion, and the orientation direction of the second alignment portion is parallel to the orientation direction of the fourth alignment portion.

12. A display device, comprising the liquid crystal panel according to claim 1.

13. A method of manufacturing a liquid crystal panel, comprising the following steps:

step 1: coating an alignment layer material on an array substrate to form a first alignment layer, coating an alignment layer material on an counter substrate to form a second alignment layer, respectively conducting friction alignment to the first alignment layer on the array substrate and the second alignment layer on the counter substrate;

step 2: covering a first protective layer over a surface of a pixel display region on the array substrate, using an oblique evaporation method so that a pretilt angle of the alignment layer of a wiring region on the array substrate is larger than that of the alignment layer of a pixel display region, and removing the first protective layer; and step 3: cell-assembling the array substrate with the counter substrate, the method further comprises: dripping liquid crystals on a surface of the array substrate or the counter substrate formed with alignment layer between the step 2 and the step 3; or injecting the liquid crystals between the array substrate and the counter substrate after the step 3, wherein the orientation of the liquid crystal molecules corresponding to the wiring region keeps perpendicular to the array substrate and the counter substrate.

14. The method of manufacturing the liquid crystal panel according to claim 13, wherein, the step 2 further comprises covering a second protective layer over a surface of a first region on the counter substrate corresponding to the pixel display region on the array substrate, using the oblique evaporation method to change an orientation direction of the alignment layer of a second region on the counter substrate corresponding to the wiring region on the array substrate, such that a pretilt angle of the alignment layer of the second region is larger than that of the alignment layer of the first region, and removing the second protective layer.

15. The liquid crystal panel according to claim 2, wherein, the orientation of the liquid crystal molecules corresponding to the thin film transistor region is identical with the orientation of the liquid crystal molecules corresponding to the wiring region.

16. The liquid crystal panel according to claim 2, wherein, the orientation of the liquid crystal molecules corresponding to the wiring region keeps perpendicular to the array substrate and the counter substrate.

17. The liquid crystal panel according to claim 3, wherein, the orientation of the liquid crystal molecules corresponding to the wiring region keeps perpendicular to the array substrate and the counter substrate.

18. The liquid crystal panel according to claim 2, wherein, a first alignment layer is disposed at a side of the array substrate close to the liquid crystal layer, and the first alignment layer comprises a first alignment portion corresponding to the pixel display region and a second alignment portion corresponding to the wiring region, and a pretilt angle of the second alignment portion is different from that of the first alignment portion.

* * * * *